(12) United States Patent
Lee et al.

(10) Patent No.: US 12,381,504 B2
(45) Date of Patent: Aug. 5, 2025

(54) MOTOR DRIVING APPARATUS

(71) Applicants: Hyundai Motor Company, Seoul (KR); Kia Corporation, Seoul (KR)

(72) Inventors: Hyun Koo Lee, Seoul (KR); Myung Ill You, Gwangju (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 202 days.

(21) Appl. No.: 17/985,354

(22) Filed: Nov. 11, 2022

(65) Prior Publication Data
US 2023/0402951 A1      Dec. 14, 2023

(30) Foreign Application Priority Data

Jun. 9, 2022   (KR) .................. 10-2022-0070039

(51) Int. Cl.
*H02P 27/08* (2006.01)
*H02J 9/06* (2006.01)
(Continued)

(52) U.S. Cl.
CPC ............ *H02P 25/22* (2013.01); *H02J 9/06* (2013.01); *H02K 5/225* (2013.01); *H02M 7/537* (2013.01); *H02P 25/18* (2013.01); *H02P 27/08* (2013.01)

(58) Field of Classification Search
CPC .......... H02P 25/22; H02P 25/18; H02P 27/08; H02M 7/537; H02J 9/06
See application file for complete search history.

(56) References Cited

U.S. PATENT DOCUMENTS

| | | | |
|---|---|---|---|
| 7,009,856 B2 * | 3/2006 | Moon | B60L 15/025 363/40 |
| 7,659,686 B2 * | 2/2010 | Osada | H02P 5/74 318/148 |

(Continued)

FOREIGN PATENT DOCUMENTS

| | | |
|---|---|---|
| CN | 111355420 A | 6/2020 |
| JP | 2005-328675 A | 11/2005 |

(Continued)

OTHER PUBLICATIONS

Extended European Search Report dated May 19, 2023, issued in corresponding European Patent Application No. 22208206.7.

*Primary Examiner* — Rina I Duda
(74) *Attorney, Agent, or Firm* — Morgan, Lewis & Bockius LLP

(57) ABSTRACT

A motor driving apparatus includes a motor including windings respectively corresponding to a plurality of phases, a first inverter including at least one first power module and providing an AC voltage corresponding to each of the phases to one end of the windings, a second inverter including a plurality of second power modules each including a changeover switch and providing the AC voltage corresponding to each of the phases to the other end of the windings based on information indicating whether the changeover switch is turned on, and a controller connected to the changeover switch and configured to control whether the changeover switch is turned on according to a motor driving mode, wherein each of the second power modules has a changeover terminal to which a first end of the changeover switch is connected, and the changeover terminals of the plurality of second power modules are short-circuited to each other.

13 Claims, 13 Drawing Sheets

(51) Int. Cl.
*H02K 5/22* (2006.01)
*H02M 7/537* (2006.01)
*H02P 25/18* (2006.01)
*H02P 25/22* (2006.01)

(56) References Cited

U.S. PATENT DOCUMENTS

| | | | | |
|---|---|---|---|---|
| 8,002,056 | B2* | 8/2011 | Chakrabarti | B60L 15/02 |
| | | | | 180/65.21 |
| 8,008,876 | B2* | 8/2011 | Yonemori | B60L 50/61 |
| | | | | 318/148 |
| 8,604,733 | B2* | 12/2013 | Liegeois | H02M 7/53873 |
| | | | | 318/400.29 |
| 9,024,563 | B2* | 5/2015 | Bunte | H02P 25/18 |
| | | | | 318/494 |
| 9,852,859 | B2* | 12/2017 | Cao | H01H 47/00 |
| 9,944,312 | B2* | 4/2018 | Inada | B62D 5/0406 |
| 10,320,321 | B2* | 6/2019 | Bettoni | H02P 27/08 |
| 10,355,581 | B2* | 7/2019 | Guven | H02M 7/5387 |
| 10,439,541 | B2* | 10/2019 | Findeisen | B60L 50/51 |
| 10,581,361 | B2 | 3/2020 | Chen et al. | |
| 2005/0162875 | A1 | 7/2005 | Rodriguez et al. | |
| 2005/0237773 | A1 | 10/2005 | Sasaki | |
| 2016/0311462 | A1* | 10/2016 | Inada | H02P 27/06 |
| 2016/0362127 | A1* | 12/2016 | Inada | H05K 7/14322 |
| 2019/0372501 | A1 | 12/2019 | Wada et al. | |
| 2022/0173687 | A1 | 6/2022 | Choi et al. | |

FOREIGN PATENT DOCUMENTS

| | | |
|---|---|---|
| JP | 2011-015455 A | 1/2011 |
| JP | 2016-048997 A | 4/2016 |
| KR | 10-2014-0022933 A | 2/2014 |
| KR | 10-2017-0090135 A | 8/2017 |
| KR | 10-2018-0059592 A | 6/2018 |

* cited by examiner

MOTOR DRIVING APPARATUS

CROSS-REFERENCE TO RELATED APPLICATION

The present application claims priority to Korean Patent Application No. 10-2022-0070039, filed on Jun. 9, 2022, the entire contents of which is incorporated herein for all purposes by this reference.

BACKGROUND OF THE PRESENT DISCLOSURE

Field of the Present Disclosure

The present disclosure relates to a motor driving apparatus, and more specifically, to a motor driving apparatus including an inverter power module integrated with a switch which is switched according to a motor driving mode.

Description of Related Art

In general, windings of respective phases included in a motor have first ends electrically connected to a single inverter and have second ends electrically connected to each other, forming a Y-connection.

When the motor is driven, a switch inside the inverter is turned ON/OFF by pulse width modulation control and applies a line voltage to the Y-connected motor windings such that, by generating an AC current, a torque is generated.

An eco-friendly vehicle (for example, electric car) powered by such a torque from a motor has fuel efficiency (or electric efficiency) determined by inverter-motor power conversion efficiency, and it is important to maximize the inverter power conversion efficiency and the motor efficiency to improve the fuel efficiency.

The efficiency of the inverter-motor system is mainly determined by the voltage usage ratio of the inverter, and the vehicle fuel efficiency may be improved when a vehicle driving point determined by the relation between the motor speed and torque is formed in a range having a high voltage usage ratio.

However, if the motor winding number is increased to increase the motor maximum torque, the range having a high voltage usage ratio becomes far from the low-torque area, which is a major vehicle driving point. This may degrade the fuel efficiency. In addition, if a major driving point is designed to be included in the range having a high voltage usage ratio from the viewpoint of fuel efficiency, the maximum motor torque may be limited, degrading the accelerating/starting performance of the vehicle.

In the pertinent technical field, there is a demand for a motor driving technology capable of improving the system efficiency while covering both low-output and high-output ranges with a single motor. As a result, a technology for driving a single motor in two different modes by use of two inserters and a mode-switching switch has been introduced.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a motor driving apparatus including an inverter power module integrated with a switch which is switched according to a motor driving mode.

To solve the above-mentioned technical problem, a motor driving apparatus according to an exemplary embodiment of the present disclosure may include: a motor including a plurality of windings respectively corresponding to a plurality of phases; a first inverter including at least one first power module and to provide an AC voltage corresponding to each of the phases to a first end of the plurality of windings; a second inverter including a plurality of second power modules each including a changeover switch and to provide the AC voltage corresponding to each of the phases to a second end of the plurality of windings based on information indicating whether the changeover switch is turned on; and a controller connected to the changeover switch and configured to control whether the changeover switch is turned on according to a motor driving mode, wherein each of the second power modules has a changeover terminal to which a first end of the changeover switch is connected, and the changeover terminals of the plurality of second power modules are short-circuited to each other.

The present disclosure is advantageous in that an inverter power module is integrated with a switch which is switched according to a motor driving mode so that no separate module is necessary in connection with the switch which is switched according to a motor driving mode, reducing the area and cost required for a motor driving apparatus.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
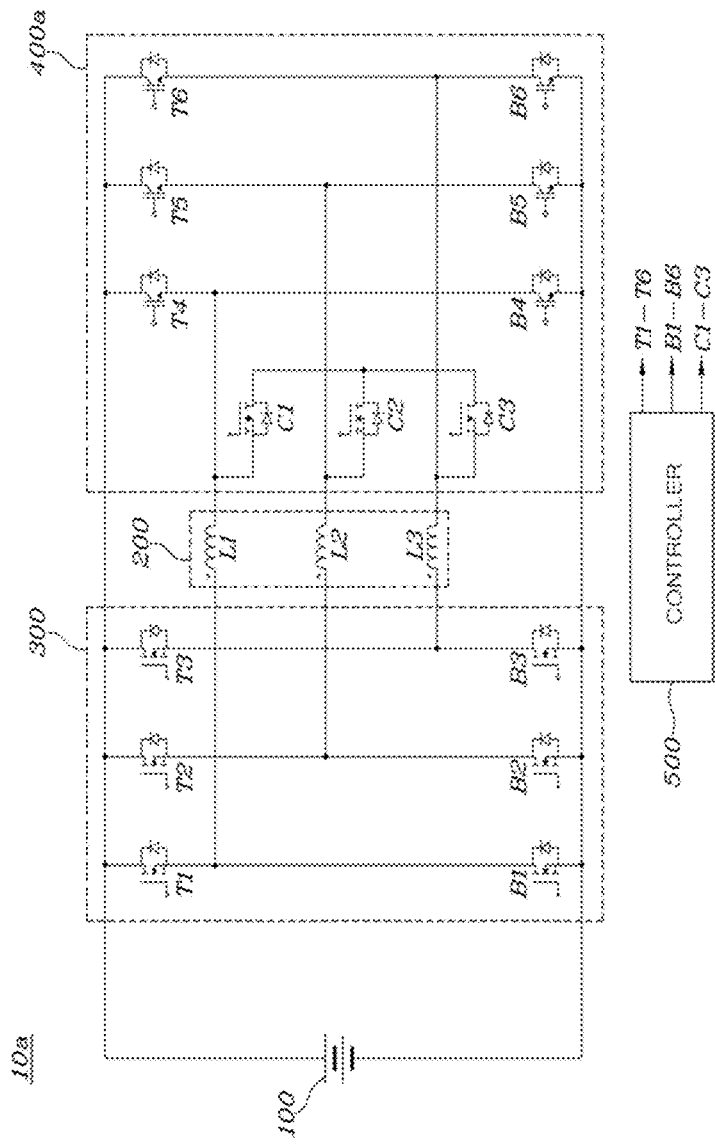
FIG. 1 is a circuit diagram illustrating a motor driving apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the description of the following embodiments, the word "predetermined" as used herein means that a value for a parameter is determined when the parameter is used in a process or algorithm. For various exemplary embodiments of the present disclosure, the value for the parameter is determined before the process or algorithm begins or while the process or algorithm is performed.

Terms such as "first" and "second" used to distinguish various elements are not limited by the elements. For example, a first component may be referred to as a second component, and conversely, a second component may be referred to as a first component.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Hereinafter, the present disclosure will be described in more detail through examples. These examples are only for illustrating the present disclosure, and the scope of protection of the rights of the present disclosure is not limited by these examples.

FIG. 1 is a circuit diagram illustrating a motor driving apparatus 10a according to an exemplary embodiment of the present disclosure.

As illustrated in FIG. 1, the motor driving apparatus 10a may include a battery 100, a motor 200, a first inverter 300, a second inverter 400a, and a controller 500.

The motor 200 may have a plurality of windings L1, L2, and L3 corresponding to each of a plurality of phases.

Figure 4:
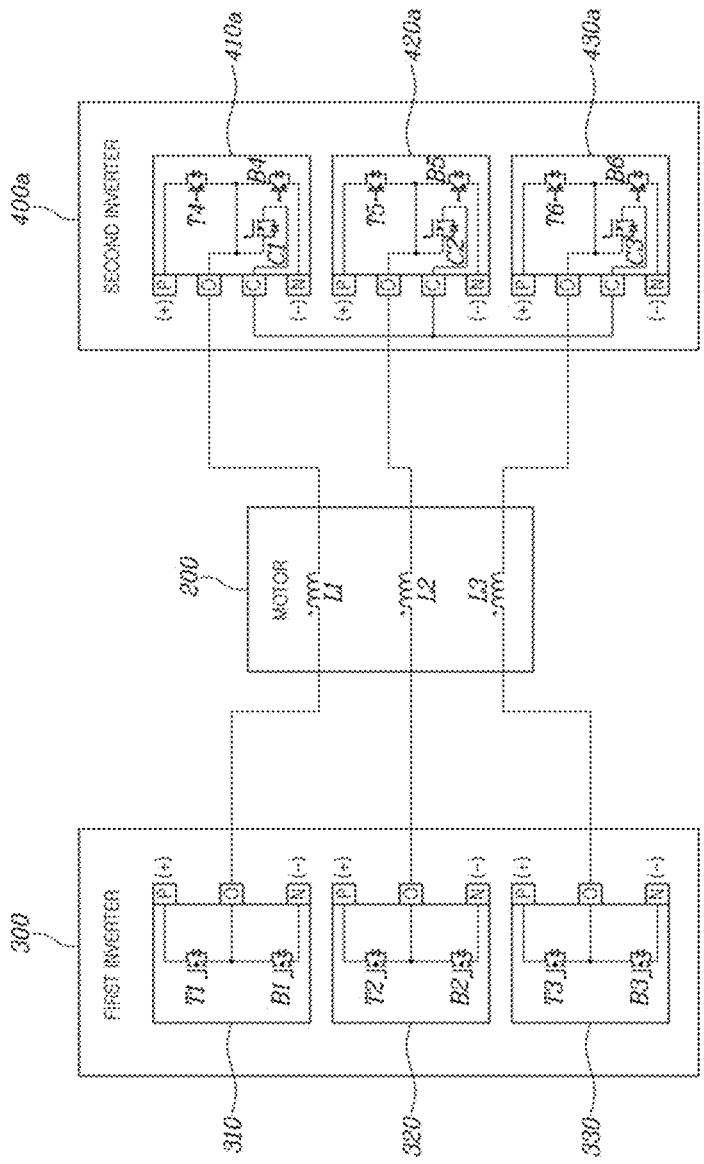
FIG. 4 is a diagram illustrating a configuration of a power module included in an inverter illustrated in FIG. 1 according to an exemplary embodiment of the present disclosure.

The first inverter 300 may be implemented as at least one first power module 310, 320, and 330 in FIG. 4 including first top switches T1 to T3 and first bottom switches B1 to B3.

The first inverter 300 may convert a DC voltage of the battery 100 into an AC voltage including a plurality of phases as the first top switches T1 to T3 and the first bottom switches B1 to B3 are switched. Furthermore, the first inverter 300 may drive the motor 200 by providing an AC voltage corresponding to each of the plurality of phases to one end of the plurality of windings L1, L2, and L3. The first top switches T1 to T3 and the first bottom switches B1 to B3 may be implemented as metal oxide semiconductor field effect transistors (MOSFETs).

The second inverter 400a may be implemented as a plurality of second power modules 410a, 420a, and 430a of FIG. 4 including second top switches T4 to T6, second bottom switches B4 to B6, and changeover switches C1 to C3.

Based on whether the changeover switches C1 to C3 are turned on, as the second top switches T4 to T6 and the second bottom switches B4 to B6 are switched, the second inverter 400a may convert a DC voltage of the battery 100 into an AC voltage including a plurality of phases. In an exemplary embodiment of the present disclosure, when the changeover switches C1 to C3 are turned off, as the second top switches T4 to T6 and the second bottom switches B4 to B6 are switched, the second inverter 400a may convert the DC voltage of the battery 100 into an AC voltage including a plurality of phases. Furthermore, the second inverter 400a may drive the motor 200 by providing the AC voltage corresponding to each of the plurality of phases to the other end of the plurality of windings L1, L2, and L3.

The second top switches T4 to T6 and the second bottom switches B4 to B6 may be implemented as transistors including the same voltage/current capacity and material. In an exemplary embodiment of the present disclosure, the second top switches T4 to T6 and the second bottom switches B4 to B6 are implemented as insulated gate bipolar transistors (IGBTs), but according to the exemplary embodiment of the present disclosure, the second top switches T4 to T6 and the second bottom switches B4 to B6 may be implemented as metal oxide semiconductor field effect transistors (MOSFETs).

Each of the changeover switches C1 to C3 may be equally implemented as any one of MOSFETs and IGBTs.

A detailed description of the configuration and operation method of the power module implementing the first inverter 300 and the second inverter 400a will be described later with reference to FIG. 4.

The controller 500 may control the first inverter 300 and the second inverter 400a to drive the motor by switching the first top switches T1 to T3, the first bottom switches B1 to B3, the second top switches T4 to T6, and the second bottom switches B4 to B6.

Furthermore, the controller 500 may control whether the changeover switches C1 to C3 provided in the second inverter 400a are turned on according to a motor driving mode. The motor driving mode may include a closed-end winding mode (CEW) and an open-end winding mode (OEW). The CEW refers to a mode in which the other end of the plurality of windings L1, L2, and L3 included in the motor 200 form a neutral point, efficiently driving the motor only through the first inverter 300. Conversely, the OEW refers to a mode in which the other end of the plurality of windings L1, L2, and L3 included in the motor 200 does not form the neutral point, increasing the driving force of the motor through not only the first inverter 300 but also the second inverter 400a.

Figure 2:
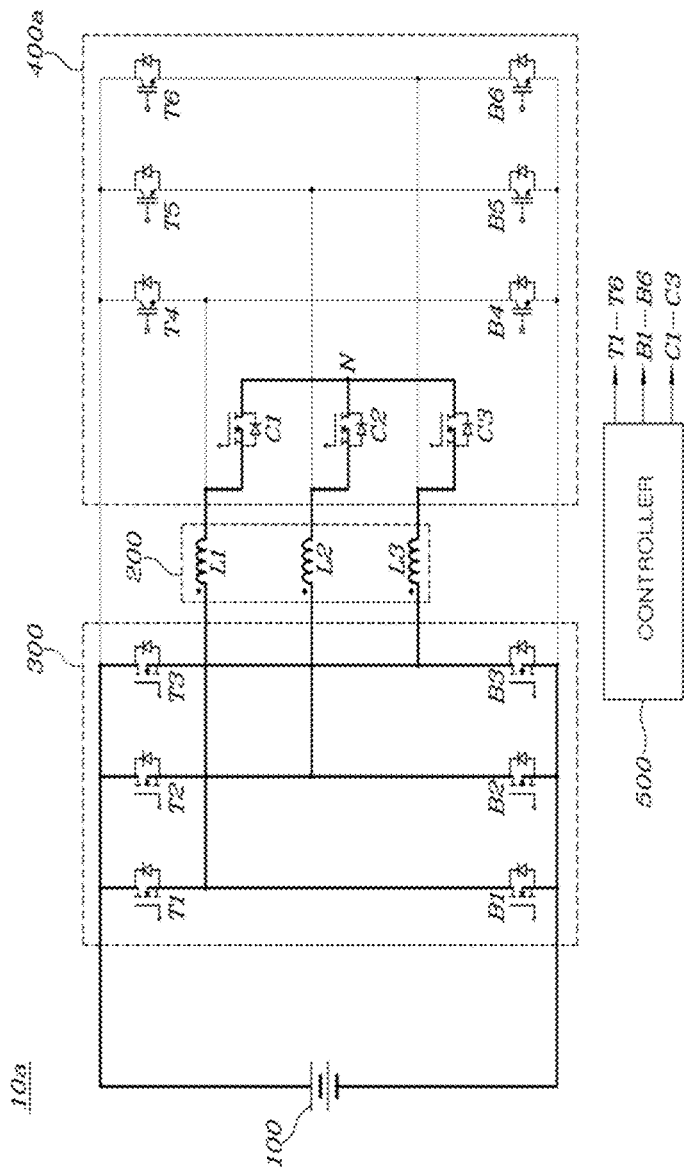
FIG. 2 is a diagram illustrating a closed-end winding mode performed in the motor driving apparatus illustrated in FIG. 1.

FIG. 2 is a diagram illustrating a closed-end winding mode (CEW) performed in the motor driving apparatus 10a illustrated in FIG. 1.

As illustrated in FIG. 2, when the motor driving mode is set to the CEW, the controller 500 may turn on the changeover switches C1 to C3 so that the other end of the plurality of windings L1 to L3 form a neutral point (N).

Furthermore, the controller 500 may control the first inverter 300 to provide an AC voltage corresponding to a plurality of phases to one end of the plurality of windings L1, L2, and L3 by complementarily switching the first top switches T1 to T3 and the first bottom switches B1 to B3.

Figure 3:
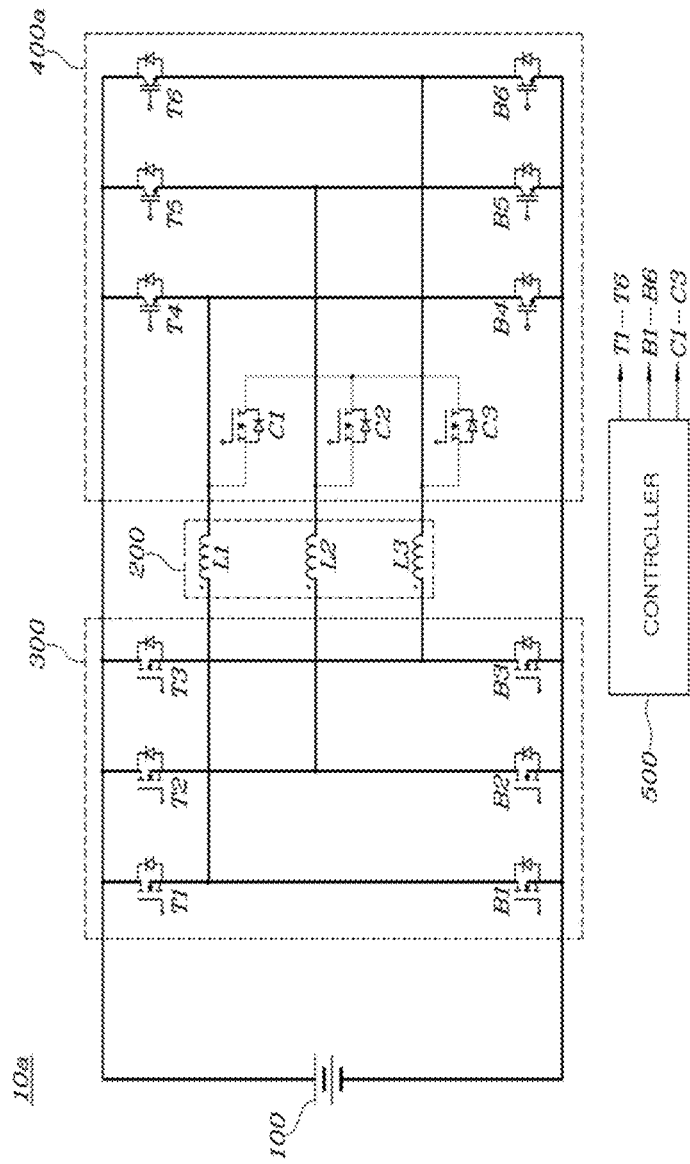
FIG. 3 is a diagram illustrating an open-end winding mode performed in the motor driving apparatus illustrated in FIG. 1.

FIG. 3 is a diagram illustrating an open-end winding mode (OEW) performed in the motor driving apparatus 10a illustrated in FIG. 1.

As illustrated in FIG. 3, when a motor driving mode is set to the OEW, the controller 500 may turn off the changeover switches C1 to C3 so that the other end of the plurality of windings L1 to L3 does not form the neutral point.

Furthermore, the controller 500 may control the first inverter 300 and the second inverter 400a to provide the AC voltage corresponding to the plurality of phases to one end or the other end of the plurality of windings L1, L2, and L3 by complementarily switching the second top switches T4 to T6 and the second bottom switches B4 to B6 as well as the first top switches T1 to T3 and the first bottom switches B1 to B3.

FIG. 4 is a diagram illustrating a configuration of a power module included in the first inverter 300 and the second inverter 400a illustrated in FIG. 1 according to an exemplary embodiment of the present disclosure. As illustrated in FIG. 4, the first inverter 300 may include a plurality of first power modules 310, 320, and 330, and the second inverter 400a may include a plurality of second power modules 410a, 420a, and 430a. The configuration and operation method of each of the plurality of first power modules 310, 320, and 330 are implemented in the same manner, and the configuration and operation method of each of the plurality of second power modules 410a, 420a, and 430a are implemented in the same manner. The first inverter 300 and the second inverter 400a may be respectively disposed on one side surface of a link capacitor used in the inverter and the other side surface thereof opposite to the one side thereof.

Each of the plurality of first power modules 310, 320, 330 may include first top switches T1 to T3, first bottom switches B1 to B3, a positive terminal P electrically connected to the positive terminal (+) of the battery 100 of FIG. 1, a negative terminal N electrically connected to the negative terminal (−) of the battery 100, and an output terminal O electrically connected to one end of any one of the plurality of windings L1 to L3. Each of the first top switches T1, T2, and T3 may be connected between the positive terminal P and the output terminal O, each of the first bottom switches B1, B2, and B3 may be connected between the negative terminal N and the output terminal O.

Each of the second power modules 410a, 420a, and 430a may include second top switches T4 to T6, second bottom switches B4 to B6, and changeover switches C1 to C3, and may have a positive terminal P electrically connected to the positive terminal (+) of the battery 100, a negative terminal N electrically connected to the negative terminal (−) of the battery 100, an output terminal O electrically connected to the other end of any one of the plurality of windings L1 to L3, and a changeover terminal C electrically connected to one end of the changeover switches C1 to C3.

Each of the second top switches T4 to T6 may be connected between the positive terminal P and the output terminal O. Drain terminals (collector terminals) of the second top switches T4 to T6 may be respectively electrically connected to the positive terminal P, and source terminals (emitter terminals) of the second top switches T4 to T6 may be respectively electrically connected to the output terminal O.

Each of the second bottom switches B4 to B6 may be connected between the negative terminal N and the output terminal O. The drain terminals (collector terminals) of the second bottom switches B4 to B6 may be respectively electrically connected to the output terminals O, and the source terminals (emitter terminals) of the second bottom switches B4 to B6 may be respectively electrically connected to the negative terminal (N).

In an exemplary embodiment of the present disclosure, the source terminals (emitter terminals) of the changeover switches C1 to C3 may be respectively electrically connected to the output terminal O and located at the same node as the source terminals (emitter terminals) of the second top switches T4 to T6. The drain terminals (collector terminals) of the changeover switches C1 to C3 may be respectively electrically connected to the changeover terminal C. The changeover terminal C may be short-circuited to each other so that the other ends of the plurality of windings L1, L2, and L3 included in the motor form a neutral point. As the changeover switches C1 to C3 that are switched according to the motor driving mode are integrated into each of the plurality of second power modules 410a, 420a, 430a, there is no need to separately provide a module for the changeover switches C1 to C3, reducing the area and cost consumed in the motor driving apparatus 10a in FIG. 1.

Because the configurations of the second power modules 410a, 420a, and 430a are all implemented in the same manner, only the configuration of the second power module 410a will be described below with reference to FIG. 5.

Figure 5:
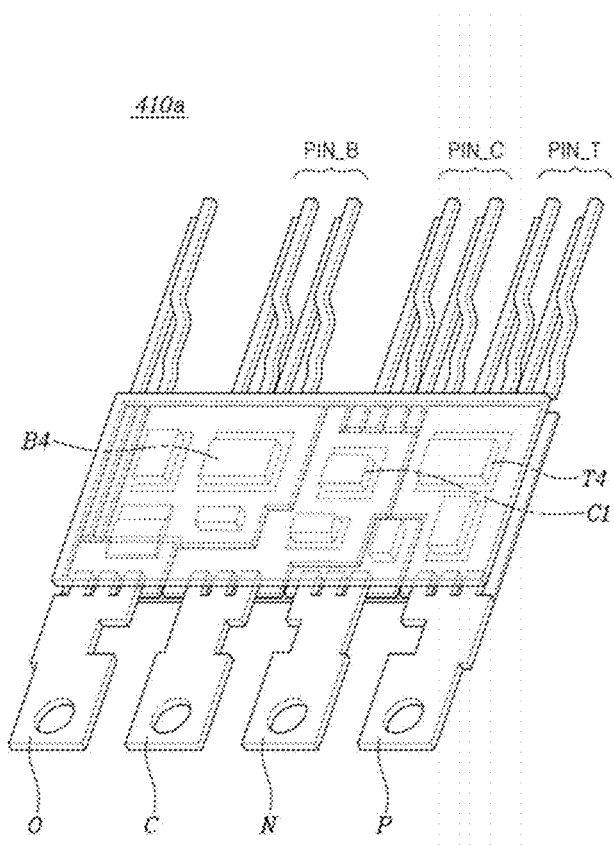
FIG. 5 is a diagram illustrating a configuration of a second power module illustrated in FIG. 4 according to an exemplary embodiment of the present disclosure.

FIG. 5 is a diagram illustrating a configuration of the second power module 410a illustrated in FIG. 4 according to an exemplary embodiment of the present disclosure. As illustrated in FIG. 5, the second power module 410a may include the second top switch T4, the second bottom switch B4, and the changeover switch C1.

An output terminal O, a changeover terminal C, a negative terminal N, and a positive terminal P may be disposed on one side of the second power module 410a, and control pins PIN_B, PIN_C, and PIN T may be disposed on the other side opposite to the one side of the second power module 410a. The second power module 410a may receive a signal for controlling a ON state or the like of the second top switch T4, the changeover switch C1, and the second bottom switch B4 through each of the control pin PIN_B, the control pin PIN_C, and the control pin PINT. At the instant time, the control pin PIN_C for controlling the ON state of the changeover switch C1 and the control pin PINT for controlling the ON state of the second top switch T4 may be disposed adjacent to each other because they do not need to have an insulating distance therebetween, reducing the area of the second power module 410a.

Figure 6:
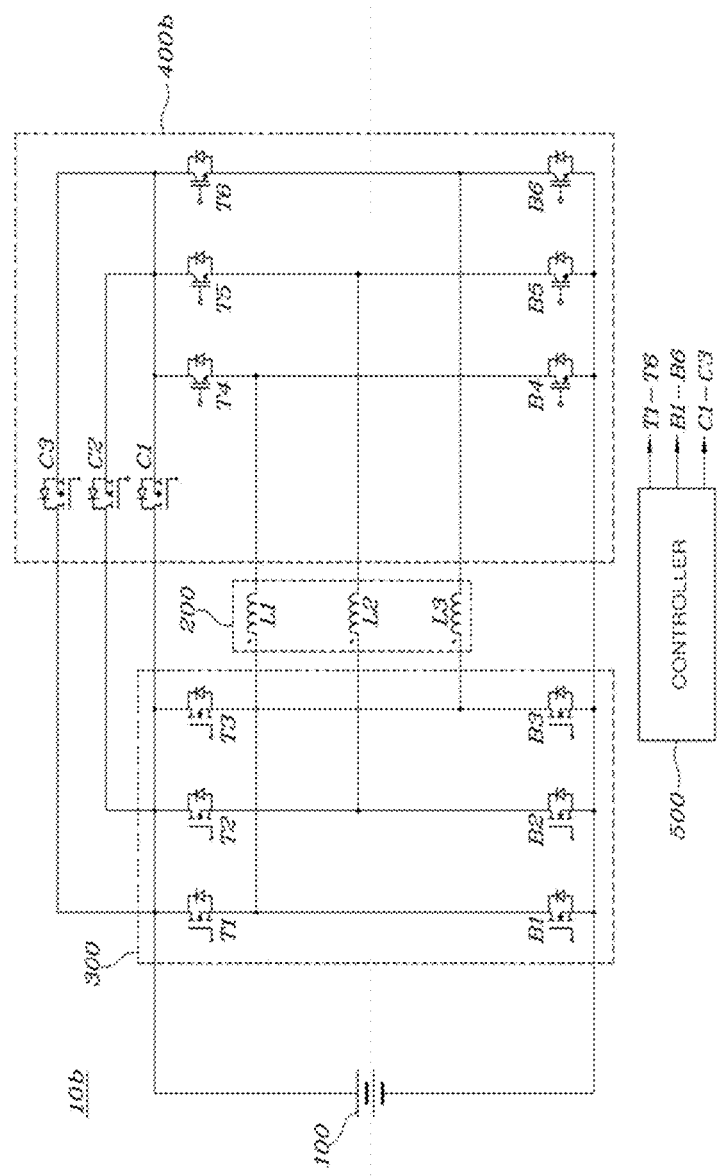
FIG. 6 is a circuit diagram illustrating a motor driving apparatus according to another exemplary embodiment of the present disclosure.

FIG. 6 is a circuit diagram illustrating a motor driving apparatus 10b according to another exemplary embodiment of the present disclosure. As illustrated in FIG. 6, the motor driving apparatus 10b may include a battery 100, a motor 200, a first inverter 300, a second inverter 400b, and a controller 500.

Figure 8:
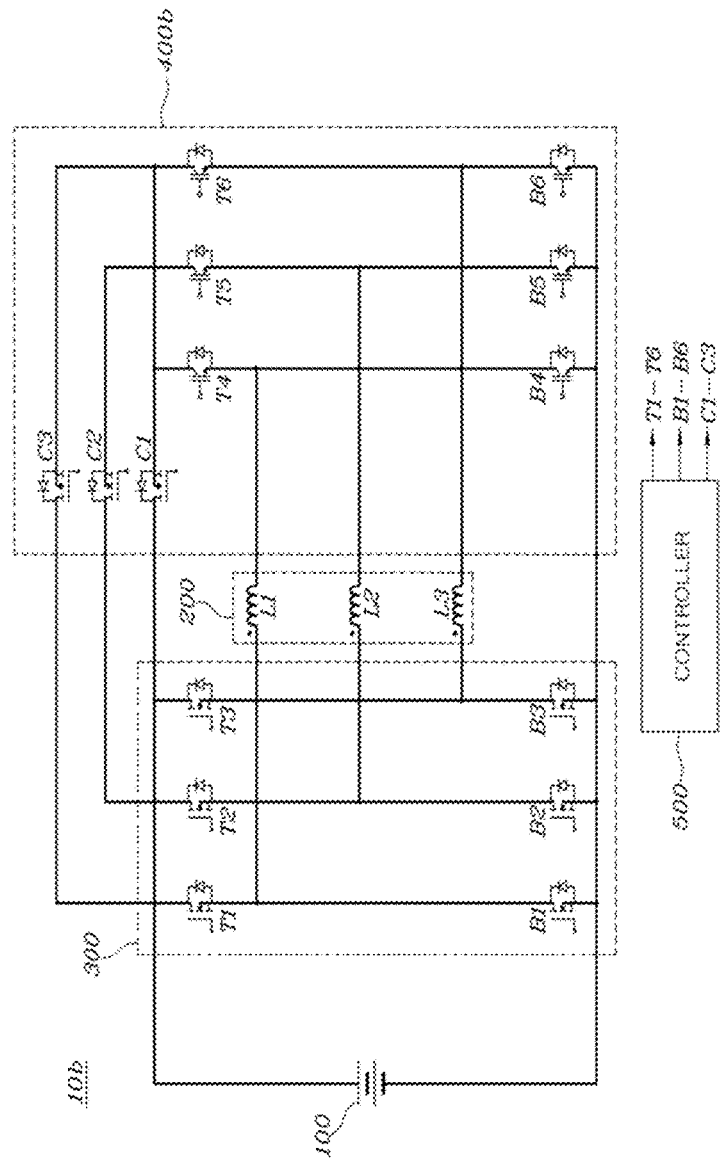
FIG. 8 is a diagram illustrating an open-end winding mode performed in the motor driving apparatus illustrated in FIG. 6.

The second inverter 400b may be implemented as a plurality of second power modules 410b, 420b, and 430b of FIG. 8 including second top switches T4 to T6, second bottom switches B4 to B6, and changeover switches C1 to C3.

In an exemplary embodiment of the present disclosure, when the changeover switches C1 to C3 are turned on, as the second top switches T4 to T6 and the second bottom switches B4 to B6 are switched, the second inverter 400b may convert a DC voltage of the battery 100 into an AC voltage including a plurality of phases. Furthermore, the second inverter 400b may drive the motor 200 by providing the AC voltage corresponding to each of the plurality of phases to the other end of the plurality of windings L1, L2, and L3.

A detailed description of the configuration and operation method of the power module implementing the first inverter 300 and the second inverter 400b will be described later with reference to FIG. 9.

Figure 7:
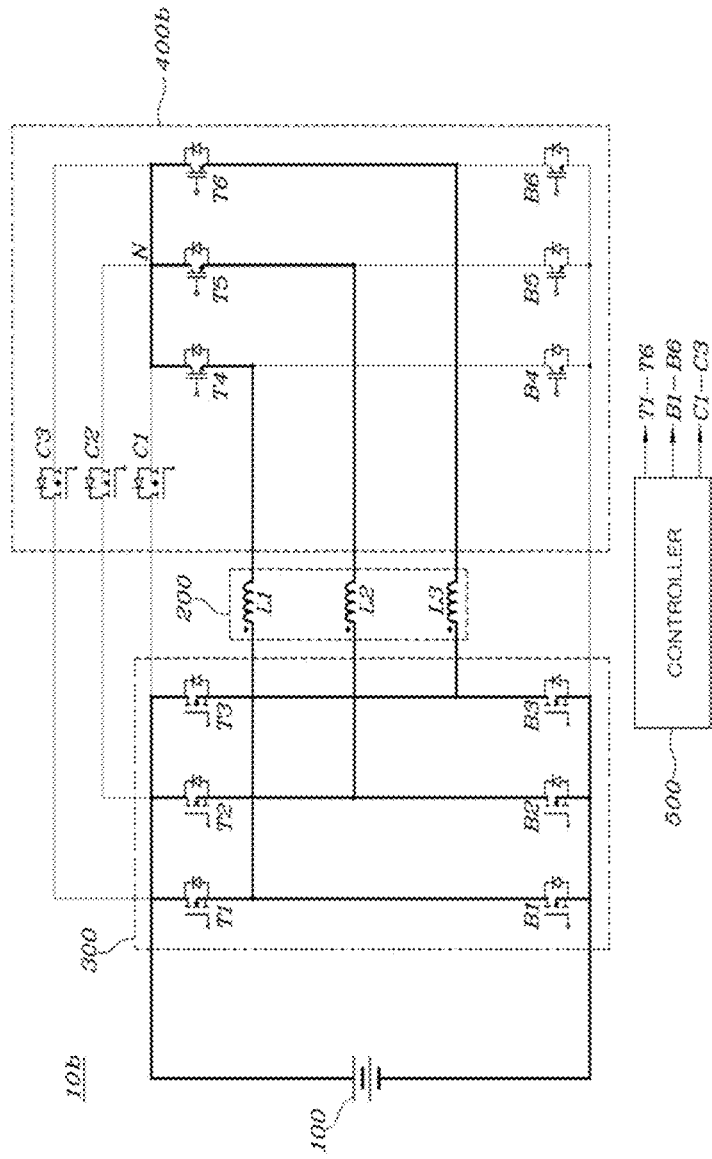
FIG. 7 is a diagram illustrating a closed-end winding mode performed in the motor driving apparatus illustrated in FIG. 6.

FIG. 7 is a diagram illustrating a closed-end winding mode (CEW) performed in the motor driving apparatus 10b illustrated in FIG. 6.

As illustrated in FIG. 7, when the motor driving mode is set to the CEW, the controller 500 may turn off the changeover switches C1 to C3 and the second bottom switches B4 to B6 and turn on the second top switch T4 to T6, so that the other end of the plurality of windings L1 to L3 form a neutral point N.

Furthermore, the controller 500 may control the first inverter 300 to provide the AC voltage corresponding to the plurality of phases to one end of the plurality of windings L1, L2, and L3 by complementarily switching the first top switches T1 to T3 and the first bottom switches B1 to B3.

FIG. 8 is a diagram illustrating an open-end winding mode (OEW) performed in the motor driving apparatus 10b illustrated in FIG. 6.

As illustrated in FIG. 8, when the motor driving mode is set to the OEW, the controller 500 may turn on the changeover switches C1 to C3 so that the other end of the plurality of windings L1 to L3 does not form the neutral point.

Furthermore, the controller 500 may control the first inverter 300 and the second inverter 400b to provide the AC voltage corresponding to the plurality of phases to one end or the other end of the plurality of windings L1, L2, and L3 by complementarily switching the second top switches T4 to T6 and the second bottom switches B4 to B6 as well as the first top switches T1 to T3 and the first bottom switches B1 to B3.

Figure 9:
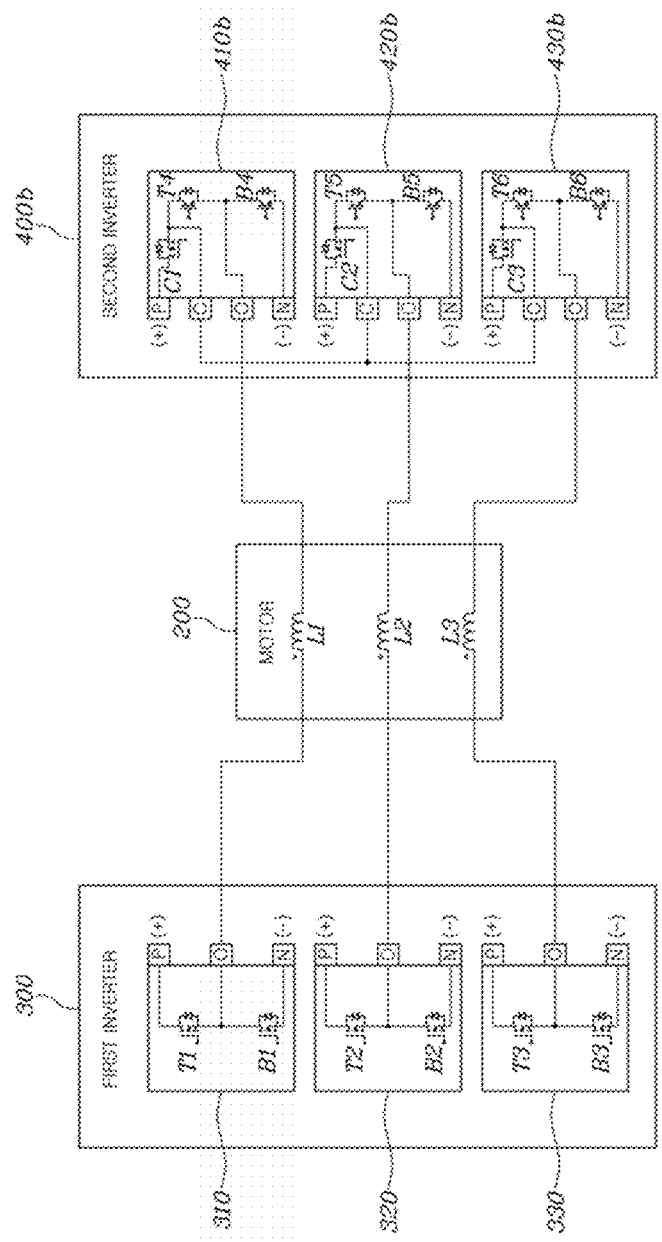
FIG. 9 is a diagram illustrating a configuration of a power module included in an inverter illustrated in FIG. 6 according to an exemplary embodiment of the present disclosure.

FIG. 9 is a diagram illustrating a configuration of the power module included in the first inverter 300 and the second inverter 400b illustrated in FIG. 6 according to an exemplary embodiment of the present disclosure.

Because the configuration and operation method of the first inverter 300 illustrated in FIG. 9 are implemented in the same manner as the first inverter 300 illustrated in FIG. 4, a detailed description thereof will be omitted.

The second inverter 400b may include a plurality of second power modules 410b, 420b, and 430b.

Each of the plurality of second power modules 410b, 420b, and 430b may include second top switches T4 to T6, second bottom switches B4 to B6, changeover switches C1 to C3, a positive terminal P electrically connected to the positive terminal (+) of the battery 100 of FIG. 6, a negative terminal N electrically connected to the negative terminal (−) of the battery 100, an output terminal O electrically connected to the other end of any one of the plurality of windings L1 to L3, and a changeover terminal C electrically connected to one end of the changeover switches C1 to C3.

In an exemplary embodiment of the present disclosure, each of the changeover switches C1 to C3 may be connected between the second top switches T4 to T6 and the positive terminal P while each of the second top switches T4 to T6 is connected between the positive terminal P and the output terminal O. drain terminals (collector terminals) of the changeover switches C1 to C3 may be respectively electrically connected to the positive terminal P, and source terminals (emitter terminals) of the changeover switches C1 to C3 may be respectively electrically connected to the changeover terminal C. The drain terminals (collector terminals) of the second top switches T4 to T6 may be located at the same node as the source terminals (emitter terminals) of the changeover switches C1 to C3, and the source terminals (emitter terminals) of the second top switches T4 to T6 may be electrically connected to the output terminal O.

Each of the second bottom switches B4 to B6 may be connected between the negative terminal N and the output terminal O. The drain terminals (collector terminals) of the second bottom switches B4 to B6 may be respectively electrically connected to the output terminal O, and the source terminals (emitter terminals) of the second bottom switches B4 to B6 may be electrically connected to the negative terminal N.

The changeover terminal C of each of the plurality of second power modules 410b, 420b, and 430b may be short-circuited to each other so that the other ends of the plurality of windings L1, L2, and L3 included in the motor form a neutral point. As the changeover switches C1 to C3 that are switched according to the motor driving mode are integrated into each of the plurality of second power modules 410b, 420b, and 430b, there is no need to separately provide a module for the changeover switches C1 to C3, reducing the area and cost consumed in the motor driving apparatus 10b in FIG. 6.

Figure 10:
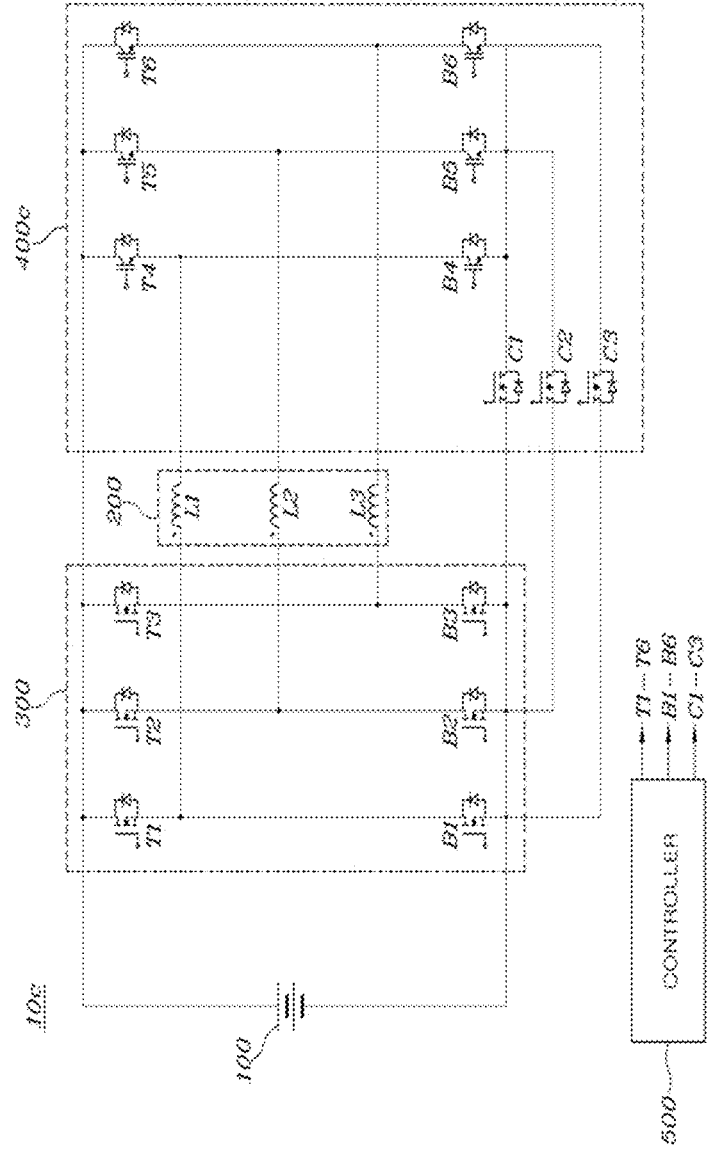
FIG. 10 is a circuit diagram illustrating a motor driving apparatus according to various exemplary embodiments of the present disclosure.

FIG. 10 is a circuit diagram illustrating a motor driving apparatus 10c according to various exemplary embodiments of the present disclosure. As illustrated in FIG. 10, the motor driving device 10c may include a battery 100, a motor 200, a first inverter 300, a second inverter 400c, and a controller 500.

The second inverter 400c may be implemented as a plurality of second power modules (410c, 420c, and 430c of FIG. 13) including second top switches T4 to T6, second bottom switches B4 to B6, and changeover switches C1 to C3.

In the present exemplary embodiment of the present disclosure, similarly to the second inverter 400b illustrated in FIG. 6, when the changeover switches C1 to C3 are turned on, as the second top switches T4 to T6 and the second bottom switches B4 to B6 are switched, the second inverter 400c may convert a DC voltage of the battery 100 into an AC voltage including a plurality of phases. Furthermore, the second inverter 400b may drive the motor 200 by providing the AC voltage corresponding to each of the plurality of phases to the other end of the plurality of windings L1, L2, and L3.

A detailed description of the configuration and operation method of the power module implementing the first inverter 300 and the second inverter 400c will be described later with reference to FIG. 13.

Figure 11:
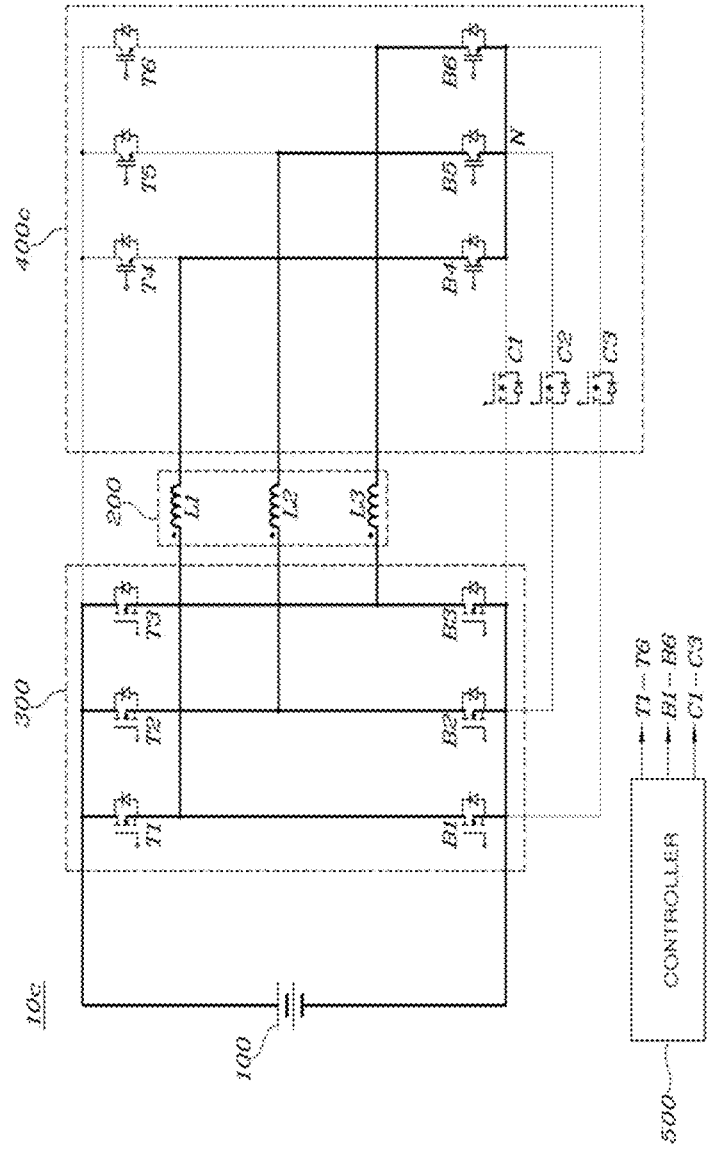
FIG. 11 is a diagram illustrating a closed-end winding mode performed in the motor driving apparatus illustrated in FIG. 10.

FIG. 11 is a diagram illustrating a closed-end winding mode (CEW) performed in the motor driving apparatus 10c illustrated in FIG. 10.

As illustrated in FIG. 11, when the motor driving mode is set to the CEW, the controller 500 may turn off the changeover switches C1 to C3 and the second top switches T4 to T6 and turn on the second bottom switches B4 to B6, so that the other end of the plurality of windings L1 to L3 form a neutral point N.

Furthermore, the controller 500 may control the first inverter 300 to provide the AC voltage corresponding to the plurality of phases to one end of the plurality of windings L1, L2, and L3 by complementarily switching the first top switches T1 to T3 and the first bottom switches B1 to B3.

Figure 12:
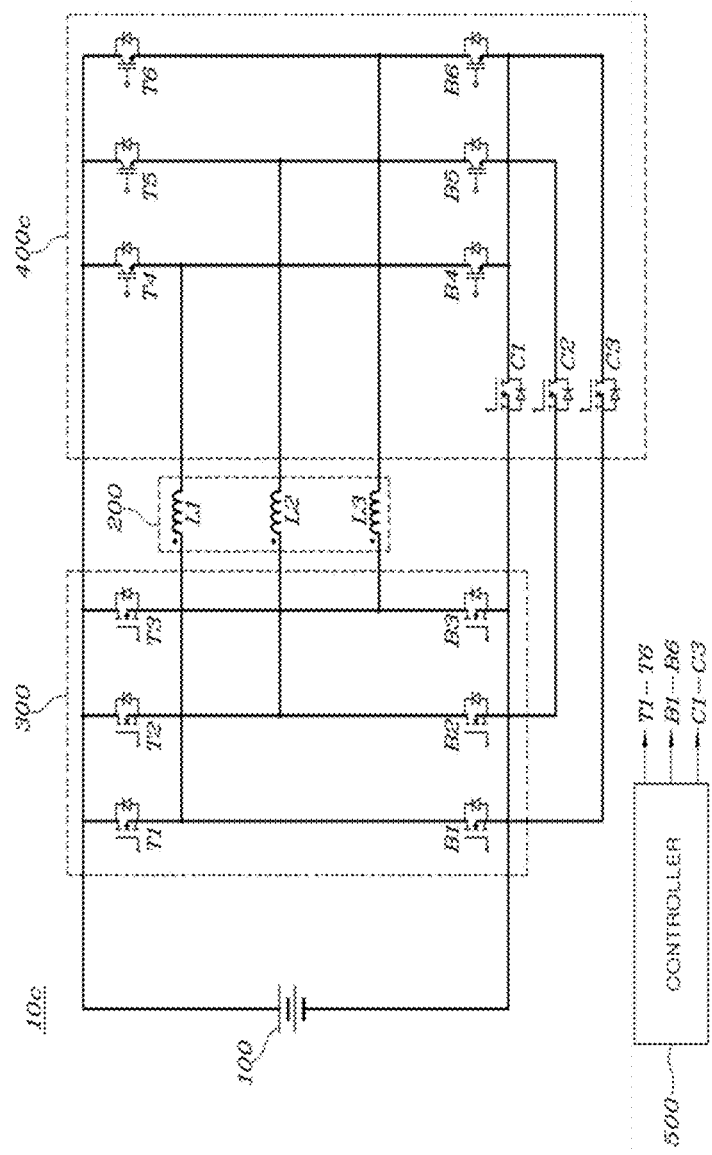
FIG. 12 is a diagram illustrating an open-end winding mode performed in the motor driving apparatus illustrated in FIG. 10.

FIG. 12 is a diagram illustrating an open-end winding mode (OEW) performed in the motor driving apparatus 10c illustrated in FIG. 10.

As illustrated in FIG. 12, when the motor driving mode is set to the OEW, the controller 500 may turn on the changeover switches C1 to C3, so that the other end of the plurality of windings L1 to L3 does not form the neutral point.

Furthermore, the controller 500 may control the first inverter 300 and the second inverter 400c to provide the AC voltage corresponding to the plurality of phases to one end and the other end of the plurality of windings L1, L2, and L3 by complementarily switching the second top switches T4 to T6 and the second bottom switches B4 to B6 as well as the first top switches T1 to T3 and the first bottom switches B1 to B3.

Figure 13:
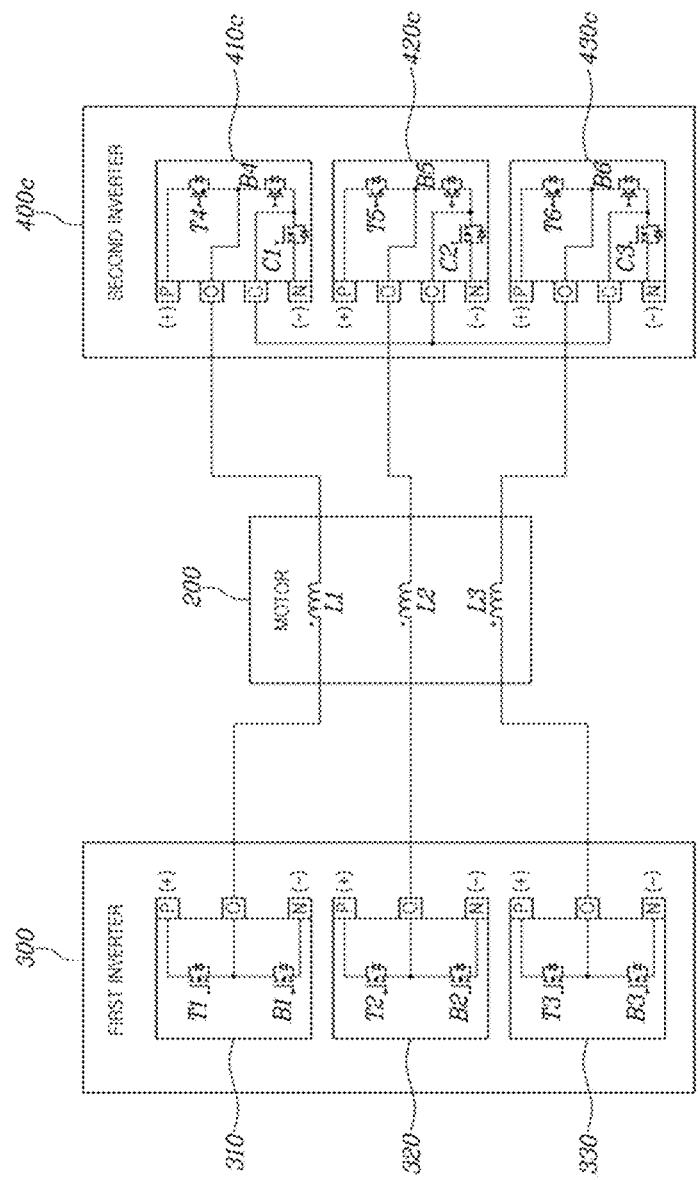
FIG. 13 is a diagram illustrating a configuration of a power module included in an inverter illustrated in FIG. 10 according to an exemplary embodiment of the present disclosure.

FIG. 13 is a diagram illustrating configurations of the inverters illustrated in FIG. 10 according to an exemplary embodiment of the present disclosure.

The configuration and operation method of the first inverter 300 illustrated in FIG. 13 are implemented in the same manner as the first inverter 300 illustrated in FIG. 5.

The second inverter 400c may include a plurality of second power modules 410c, 420c, and 430c.

Each of the plurality of second power modules 410c, 420c, and 430c may include second top switches T4 to T6, second bottom switches B4 to B6, changeover switches C1 to C3, a positive terminal P electrically connected to the positive terminal (+) of the battery 100 of FIG. 10, a negative terminal N electrically connected to the negative terminal (−) of the battery 100, an output terminal O electrically connected to the other end of any one of the plurality of windings L1 to L3, and a changeover terminal C electrically connected to one end of the changeover switches C1 to C3.

In the present exemplary embodiment of the present disclosure, each of the changeover switches C1 to C3 may be connected between the second bottom switches B4 to B6 and the negative terminal N while each of the second bottom switches B4 to B6 is connected between the negative terminal N and the output terminal O. source terminals (emitter terminals) of the changeover switches C1 to C3 may be respectively electrically connected to the negative terminal N, and drain terminals (collector terminals) of the changeover switches C1 to C3 may be respectively electrically connected to the changeover terminal C. The source terminals (emitter terminals) of the second bottom switches B4 to B6 may be located at the same node as the drain terminals (collector terminals) of the changeover switches C1 to C3, and the drain terminals (collector terminals) of the second bottom switches B4 to B6 may be electrically connected to the output terminal O.

Each of the second top switches T4 to T6 may be connected between the positive terminal P and the output terminal O. The drain terminals (collector terminals) of the second top switches T4 to T6 may be respectively electrically connected to the positive terminal P, and the source terminals (emitter terminals) of the second top switches T4 to T6 may be respectively electrically connected to the output terminal O.

The respective changeover terminals C of the plurality of second power modules 410c, 420c, and 430c may be short-circuited to each other so that the other ends of the plurality of windings L1, L2, and L3 included in the motor form a neutral point. As the changeover switches C1 to C3 that are switched according to the motor driving mode are integrated into each of the plurality of second power modules 410c, 420c, 430c, there is no need to separately provide a module for the changeover switches C1 to C3, reducing the area and cost consumed in the motor driving apparatus 10c in FIG. 10.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A motor driving apparatus comprising:
   a motor including a plurality of windings respectively corresponding to a plurality of phases;
   a first inverter including at least one first power module and configured to provide an alternating current (AC) voltage corresponding to each of the phases to a first end of the plurality of windings;
   a second inverter including a plurality of second power modules each including a changeover switch and configured to provide the AC voltage corresponding to each of the phases to a second end of the plurality of windings based on information indicating whether the changeover switch is turned on; and
   a controller connected to the changeover switch and configured to control whether the changeover switch is turned on according to a motor driving mode,
   wherein each of the second power modules has a changeover terminal to which a first end of the changeover switch is connected,
   wherein the changeover terminals of the plurality of second power modules are circuited connected to each other, and
   wherein each of the second power modules further includes:
   a second top switch;
   a second bottom switch;
   a positive terminal electrically connected to a positive terminal of a battery;
   a negative terminal electrically connected to a negative terminal of the battery; and
   an output terminal electrically connected to a second end of one of the plurality of windings,
   wherein the second top switch is connected between the positive terminal and the output terminal, and
   wherein the second bottom switch is connected between the negative terminal and the output terminal.

2. The motor driving apparatus of claim 1, wherein the controller is configured to:
   control whether the changeover switch is turned on so that the second end of the plurality of windings form a neutral point when the motor driving mode is set to a closed-end winding mode, and
   control whether the changeover switch is turned on so that the second end of the plurality of windings does not form the neutral point when the motor driving mode is set to an open-end winding mode.

3. The motor driving apparatus of claim 1, wherein the at least one first power mode includes:
   a first top switch;
   a first bottom switch;
   a positive terminal electrically connected to the positive terminal of the battery;
   a negative terminal electrically connected to the negative terminal of the battery; and
   an output terminal electrically connected to a first end of one of the plurality of windings,
   wherein the first top switch is connected between the positive terminal and the output terminal, and
   wherein the first bottom switch is connected between the negative terminal and the output terminal.

4. The motor driving apparatus of claim 3, wherein the controller is configured to complementarily switch the first top switch and the first bottom switch.

5. The motor driving apparatus of claim 3, wherein the first top switch and the first bottom switch are implemented as metal oxide semiconductor field effect transistors (MOSFETs).

6. The motor driving apparatus of claim 1, wherein the second top switch and the second bottom switch are identically implemented as one of a metal oxide semiconductor field effect transistor (MOSFET) and an insulated gate bipolar transistor (IGBT).

7. The motor driving apparatus of claim 1, wherein the respective changeover switches are identically implemented as one of an MOSFET and an IGBT.

8. The motor driving apparatus of claim 1, wherein a second end of the changeover switch is electrically connected to the output terminals of the plurality of second power modules, respectively.

9. The motor driving apparatus of claim 8, wherein the controller is configured to:
   turn on the changeover switch so that the second end of the plurality of windings form a neutral point when the motor driving mode is set to a closed-end winding mode, and
   turn off the changeover switch so that the second end of the plurality of windings does not form the neutral point when the motor driving mode is set to an open-end winding mode.

10. The motor driving apparatus of claim 1,
    wherein a second end of the changeover switch is electrically connected to the positive terminals of the plurality of second power modules, respectively, and
    wherein the second top switch is connected between the first end of the changeover switch and the output terminal.

11. The motor driving apparatus of claim 10, wherein the controller is configured to:
    turn on the second top switch and turn off the second bottom switch and the changeover switch so that the second end of the plurality of windings form a neutral point when the motor driving mode is set to a closed-end winding mode, and turn on the changeover switch so that the second end of the plurality of windings does not the neutral point when the motor driving mode is set to an open-end winding mode.

12. The motor driving apparatus of claim 1, wherein each of the changeover switches is electrically connected to the negative terminal of the plurality of second power modes, and wherein the second bottom switch is connected between the first end of the changeover switch and the output terminal.

13. The motor driving apparatus of claim 12, wherein the controller is configured to:

turn on the second bottom switch and turn off the second top switch and the changeover switch so that the second end of the plurality of windings forms a neutral point when the motor driving mode is set to a closed-end winding mode, and turn on the changeover switch so that the second end of the plurality of windings does not the neutral point when the motor driving mode is set to an open-end winding mode.

* * * * *